United States Patent Office 3,044,880
Patented July 17, 1962

3,044,880
METHOD OF MAKING A COOKED POTATO PRODUCT
Stephen W. Bogyo, Tarrytown, N.Y., and John A. Rikert, Alpine, and Gerald J. Winter, West Norwood, N.J., assignors to General Foods Corporation, White Plains, N.Y., a corporation of Delaware
No Drawing. Filed Jan. 9, 1959, Ser. No. 785,790
3 Claims. (Cl. 99—100)

The present invention relates to the production of a fat-containing potato product capable of offering a desirable crisp friable texture like that of fried potato chips.

In the normal process for production of potato chips raw or blanched potato slices are immersed in fat at a temperature of 350°–390° F. After frying the product is characteristically of a crisp friable texture having about 30–40% fat and a brown color. In many continuous operations for the production of such a foodstuff there are a number of disadvantages which have limited the large scale distribution of the product.

In the first place, although the oil or fat used in producing a potato chip is continuously replenished as it is used up, the fat material deteriorates to a point where it must eventually be discarded; this, of course, is uneconomical.

Secondly, and of great significance, the product obtained from such a deep fat frying procedure is such that it has a relatively short shelf life under normal packaging conditions; e.g., in packaging with a cellophane-type pouch, the usual and acceptable shelf life of the fried potato chip in commerce today is in the order of 3 to 6 weeks.

Thirdly, such deep fat fried potato chips lose their desirable oven freshness within a day or two; obviously, a nationally distributed product of the present process suffers greatly in its acceptability by reason of the interval between its production and its consumption.

Attempts have been made to obtain better stability of the product by reducing the temperature at which the raw or partially blanched potato chip is fried. However, under such practice, the product resulting is even less desirable inasmuch as it has an unduly high fat content and a leathery, tough, non-crisp quality. To obtain longer shelf life by vacuum packing, a deep fat fried potato chip processed by the conventional technique is expensive, requires expensive packaging, and offers only limited shelf life improvement.

An improved process and product substantially eliminating all of the foregoing difficulties in a thoroughly practical manner has now been discovered such that a potato chip and like product can be effectively distributed from a single point of manufacture. The present invention is founded upon the discovery that when unfried raw or partially blanched potato slices or other desired potato pieces are immersed in a warm liquid fat or oil under a low pressure or substantial vacuum of at least 100 millimeters of mercury pressure (absolute), the problems mentioned hereinabove are substantially alleviated. The present process involves creation of a temperature differential between the boiling point of water contained in the raw or blanched potato slices or pieces and that of the heat transfer medium (fat or oil) of approximately 150°–180° F. Although some improvement is obtained at a lower vacuum it is generally found, for the purposes of the present invention, that the desired frying of the potato product does not take place unless an absolute pressure in the order of 100 millimeters of mercury is employed, and preferably a higher vacuum in the order of about 30 millimeters. The temperature of the fat or oil at which the raw or partially blanched potato is processed will be about 220°–300° F. The product in this condition has a stability far in excess of conventional deep fat fried products because the oil or fat used in the process has not been exposed to deterioratingly high temperatures and, also, because under the vacuum conditions the oil or fat has not been in contact with significantly less oxygen, such oxygen exposure being also detrimental to the stability of fats and oils. Maintaining the above vacuum and temperature conditions will result in a very rapid, almost eruptive removal of the water from the potato and the highly desirable friable texture of good potato chips and potato snack items generally will be obtained.

The processed potato product may be now characterized as one wherein all features of good potato chips or similar snack items have been developed with the exception of color and flavor development. The treated product color and flavor are achieved by the convenient and inexpensive step of heating the treated potato product to a temperature of about 275°–400° F. (preferably, about 375° F.). This final treatment can be practiced either by the consumer in the household or the food processor. This may be done by heating the treated potato product with circulating hot air at a temperature of about 270° F.–400° F. until a fried potato flavor and color are produced. In the case of a housewife, or institutional operator such as a restaurateur, the product is of the "brown-'n-serve" type. Thus, the housewife need simply place the product in the oven and bake. In this way the product will have the charactertistic oven freshness of potato chips.

In the case of a food processor the fat or oil impregnated potato product can be manufactured at a single point and distributed to strategically located centers whereat the product can be heated to the above specified temperature. Although it is not necessary to subject the oil or fat impregnated product to an additional deep fat frying, for certain tastes, the product may be subjected to an additional deep-fat frying.

The treated potato product removed from the vacuum conditions of the present invention and drained free of fat or oil characteristically has a fat content in the order of 30–40% with a moisture content of 3% or more. In the case of a potato chip type product, the product will have a fat content in the order of 30–40%; in the case of a product capable of consumption in place of conventional French fried potato strips or chunks the product will have a lower fat content in the order of 10–20% by weight. The extent to which fat is incorporated into the product will depend upon the duration of the treatment as well as the degree of vacuum practiced. The treated potato product can be distributed either in a frozen condition in case of a high moisture product, typically French fried potatoes, or advantageously distributed in an unfrozen condition in the case of a lower moisture product, typically potato chips. Generally, the product will have a moisture content of 12% or less, and desirably has a minimum moisture content for effective browning in eventual heat treatment in excess of about 3%.

The invention will now be more fully understood by reference to the following specific example:

*Example 1*

Raw potatoes of approximately 80% moisture were peeled and sliced into discs of about 1.5 mm. thickness and given a five-minute cold water rinse to remove surface starch. The slices were blanched in boiling water for 3 minutes and then removed and placed in cold water; this step serves to remove excess reducing sugars; this step is optional and may be omitted where a potato of an acceptable sugar level is available. The potato slices were then submerged in hydrogenated cottonseed oil at a temperature of 230°–240° F. in a vacuum pot still which was previously evacuated to an absolute pressure of 35 mm. Hg. The potato slices were subjected to these conditions for a period of 5 minutes during which time they were substantially dehydrated. The treated slices were then removed and drained of excess oil. The product had a fat content in the order of 38% and had all of the aforesaid characteristics of conventional deep fat fried potato chips except that the characteristic color and flavor were not developed. The slices were then salted and air toasted in a circulating hot air dryer having three drying sections whereat the slices are subjected to successive temperatures of 315°, 295° and 280° F. A Young Brothers dryer was used and the slices or chips were passed through the successive sections thereof in a period of 10 minutes. The finished product contained approximately 35% oil and in all respects resembled deep fat fried chips.

While the present invention has been described with particular reference to specific example, it is not to be limited thereby, but reference is to be had to the appended claims for a definition of its scope.

What is claimed is:

1. The method of producing a fat-containing potato product capable of offering a desirable crisp, friable texture and fried potato flavor and color which comprises immersing raw potato slices in a warm liquid fatty composition under a vacuum of at least 100 millimeters absolute pressure, the temperature differential between the boiling point of water contained in the potato slices and that of said liquid fatty composition being about 150°–180° F., and maintaining said absolute pressure and temperature conditions to effect rapid eruptive removal of water from the potato slices until a product of friable texture having a moisture content of at least about 3%, and less than 12% by weight is obtained.

2. The method of claim 1 wherein said potato slices are partially blanched to reduce the sugar content thereof prior to immersion in said liquid fatty composition.

3. The method of claim 1 wherein the treated potato product of claim 1 is heated with circulating hot air at a temperature of about 270°–400° F. until a fried potato flavor and color are produced.

References Cited in the file of this patent

UNITED STATES PATENTS

| | | |
|---|---|---|
| 2,084,721 | Ashby | June 22, 1937 |
| 2,203,638 | Smaltz et al. | June 4, 1940 |
| 2,611,705 | Hendel | Sept. 23, 1952 |
| 2,708,636 | Rivoche | May 17, 1955 |
| 2,762,709 | Janis et al. | Sept. 11, 1956 |
| 2,778,736 | Wagner | Jan. 22, 1957 |
| 2,919,988 | Erickson et al. | Jan. 5, 1960 |